May 21, 1957

M. P. PUGEL 2,792,638

LEVEL VIAL

Filed Nov. 14, 1955

INVENTOR.
Mathias P. Pugel
BY Quarles & French
Att'ys.

United States Patent Office 2,792,638
Patented May 21, 1957

2,792,638

LEVEL VIAL

Mathias P. Pugel, Greenfield, Wis.

Application November 14, 1955, Serial No. 546,674

1 Claim. (Cl. 33—211)

The invention relates to spirit levels and more particularly to a vial for use in such levels.

A spirit level vial is a sealed glass body containing a liquid and a level indicating bubble adapted to register with indicator marks on the vial when the level is in its correct position, the body being curved lengthwise. The optical maximum is a bubble with an uninterrupted, sharp, uniform bright rim. Enclosing the ends of the vial in opaque mountings, according to known practice, reduces end illumination of the vial and dims the bubble rim near the ends where the rim is most needed to cooperate with the indicator marks, and while this practice provides a balanced bubble, it is not easily read in dim light. Where the vial has a drawn tip or a solder mass is located in one end near or at the center, such tip or mass acts to shade the bright rim of the bubble at this end giving an unbalanced bubble which may be inaccurately read. In dim light, these above named light interference effects at the ends or an end of the bubble detract from obtaining accurate readings. The above defects have been overcome in the present invention by locating the vial closure in the side wall of the vial close to one end as such a location does not materially impair the optics of the bubble rim. With the vial so closed, it is feasible to employ vials which are exposed to illumination from all directions since the bubble rims remain uniform at both ends, and the light from these ends enables the bubble to be readily read in a dim light.

The invention further consists in the several features hereinafter described and more particularly defined by the claim at the conclusion hereof.

Figure 1:
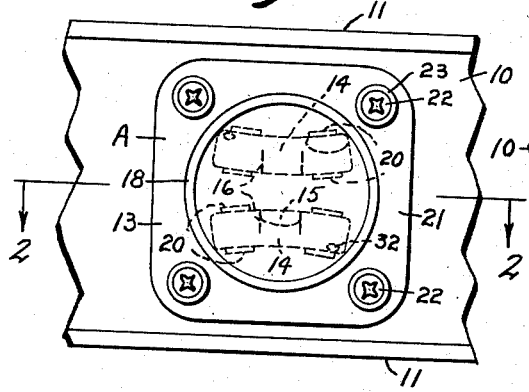
Fig. 1 is a side elevation view of a spirit level having vials embodying the invention, parts of the level being broken away.
Figure 2:
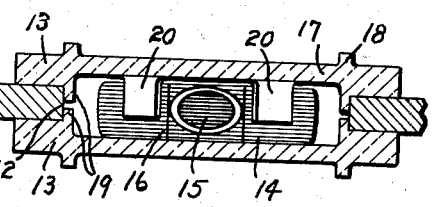
Fig. 2 is a detailed horizontal sectional view taken on the line 2—2 of Fig. 1.

Referring to the drawings, the numeral 10 designates the frame of the level having test surfaces 11 for engagement with a surface of the work to be tested and provided with an opening 12 in which an indicator unit A is mounted.

The indicator unit, here shown, includes a pair of similar holders 13, a pair of vials 14, and means for mounting said holders and vials in operative position on the frame.

Each of the vials 14 is a glass tube, closed at its ends, and of substantially uniform diameter throughout its length but curved slightly between its ends so that the position of the bubble 15 formed by the liquid within the vial may be easily seen or read with reference to the true level indicator marks 16 on the vial.

Each of the holders 13 is of transparent material preferably a suitable transparent molded plastic such as a styrene polymer or acrylic polymer or the like. Each holder is formed to provide a rectangular base portion 17 whose outer side has a reinforcing and protective annular flange 18 spaced from its outer edges and whose inner side has a reinforcing and centering annular flange 19 and spaced pairs of eccentrically disposed vial receiving projections 20 that incline at a slight angle, for example 3°, with reference to the horizontal axis of the frame to accommodate the curvature of the vial. The height of the projections is less than the diameter of a vial. The distance between the projections 20 of each pair is preferably somewhat less than the diameter of the vial so that the ends of the vial engaging these projections may be snapped into place between them. The annular flange 19 is of a diameter to snugly fit the opening 12 so that when the holders are assembled together, dust or dirt will be substantially blocked from entrance into the space housing the vials.

The rim portion 21 of each holder has holes at its corners to loosely receive clamping screws 22 that are mounted in threaded holes in the frame, the holes being disposed at equal distances from the centers of the holders. Each holder is the exact duplicate of the other so that when the holders are assembled in the frame, the vial holding projections of one will be spaced from the central horizontal axis of the level the same distance as the other.

The holders are positioned with the flange 19 of each holder engaging in the opening 12, it being noted that each vial should be so placed in the projections 20 that its indicator marks 16 face inwardly and extend equally on either side of a central plane through the center lines of the vials. Since the screws 22 are loose in the holders, each of these holders may be accurately positioned in the frame by bringing the frame into contact with a test surface and then angularly adjusting the holder until the bubble 15 comes to a true position and then tightening up the screws 22 for this holder and following the same procedure for the holders on the opposite side of the frame.

In the tightening up of the screws 22 the vial of one holder is clamped between the projections 20 of this holder and the base or inner surface of the other holder, and at the same time the holders are clamped against the frame.

Figure 4:
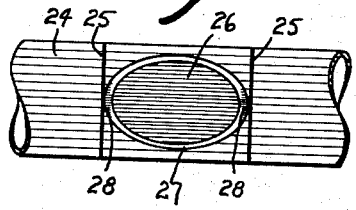
Fig. 4 is a view similar to Fig. 3 showing the shading effect of a vial having light obstructed ends.
Figure 5:
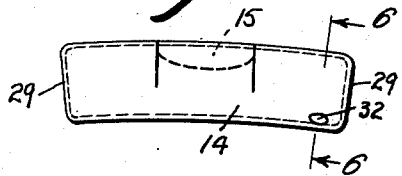
Fig. 5 is a side elevation view of my improved vial.
Figure 6:
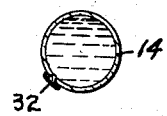
Fig. 6 is a vertical sectional view taken on the line 6—6 of Fig. 5.

The above described holders represent one way in which the vials may be mounted in the frame of the level so that light access to the ends of the vial may be had. Frequently, the ends of the vial are in the form of drawn tips that are cemented to the holder, thus blocking off the passage of light through the ends of the holder. The effect of this blocking is graphically represented in Fig. 4 wherein the numeral 24 designates the vial, 25 the indicator marks, and 26 the bubble which has the rim portion 27 that is darkened at its indicator cooperating ends 28 because of the blocking off of light from the ends of the vial. While the light effects are balanced at both ends of the bubble because of the darkening effect at the ends, it is not easily read in a dim light. The same darkening effect of one end of the bubble occurs where a solder mass forms a seal at one end of the vial, and in this instance the light effect is unbalanced and may cause inaccurate reading of the bubble's position.

Figure 7:
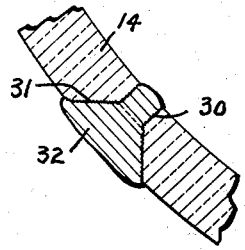
Fig. 7 is an enlarged sectional view of parts shown in Fig. 6.

To obviate the rim darkening effect of the bubble as noted above, the vial of the present invention has plain flat ends 29 through which light can freely pass, and the sealing opening is located on the side of the vial near one end. This opening is made by drilling a small hole 30 through the side of the vial 14 with a suitable drill and then conically counterboring the front side of this hole with a suitable drill to form a cone-shaped opening 31. The size of the hole 30 is small enough so that when melted solder 32 is applied to the hole, it will not run through it. Drilling produces holes 30 and 31 with roughened surfaces as indicated in Fig. 7 so that the sealing compounds will more readily adhere to the glass. These surfaces before soldering are treated with a suitable flux. The flux may be a fired in place metallic glaze to form a surface to which solder will adhere or any other suitable flux.

Figure 3:
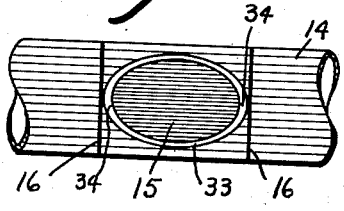
Fig. 3 is a top view of a vial embodying the invention, parts being broken away.

In a vial thus formed, the light from the ends thereof is not blocked off, and the rim portion 33 of the vial as indicated in Fig. 3 will be bright at the ends 34 so that it can be readily read in its position relative to the indicator marks 16 and even in a dim light.

I desire it to be understood that this invention is not to be limited to any particular form or arrangement of parts except in so far as such limitations are included in the appended claim.

What I claim as my invention is:

A level vial comprising a cylindrical lengthwise curved glass tube of substantially uniform side wall thickness containing a liquid and a gas bubble and having flat glass end walls, a drill roughened filling opening in the side wall of the tube near one end to minimize obstruction of light passing from this end to the region of the bubble and outwardly flared at least to a depth of half the thickness of said side wall, and a metallic seal for said opening united with the roughened walls of said flared portion of said opening.

References Cited in the file of this patent
UNITED STATES PATENTS

| | | |
|---|---|---|
| 1,878,751 | Axt et al. | Sept. 20, 1932 |

FOREIGN PATENTS

| | | |
|---|---|---|
| 32,979 | Denmark | Mar. 17, 1924 |
| 534,255 | Great Britain | Mar. 3, 1941 |
| 665,628 | Great Britain | Jan. 30, 1952 |